United States Patent Office.

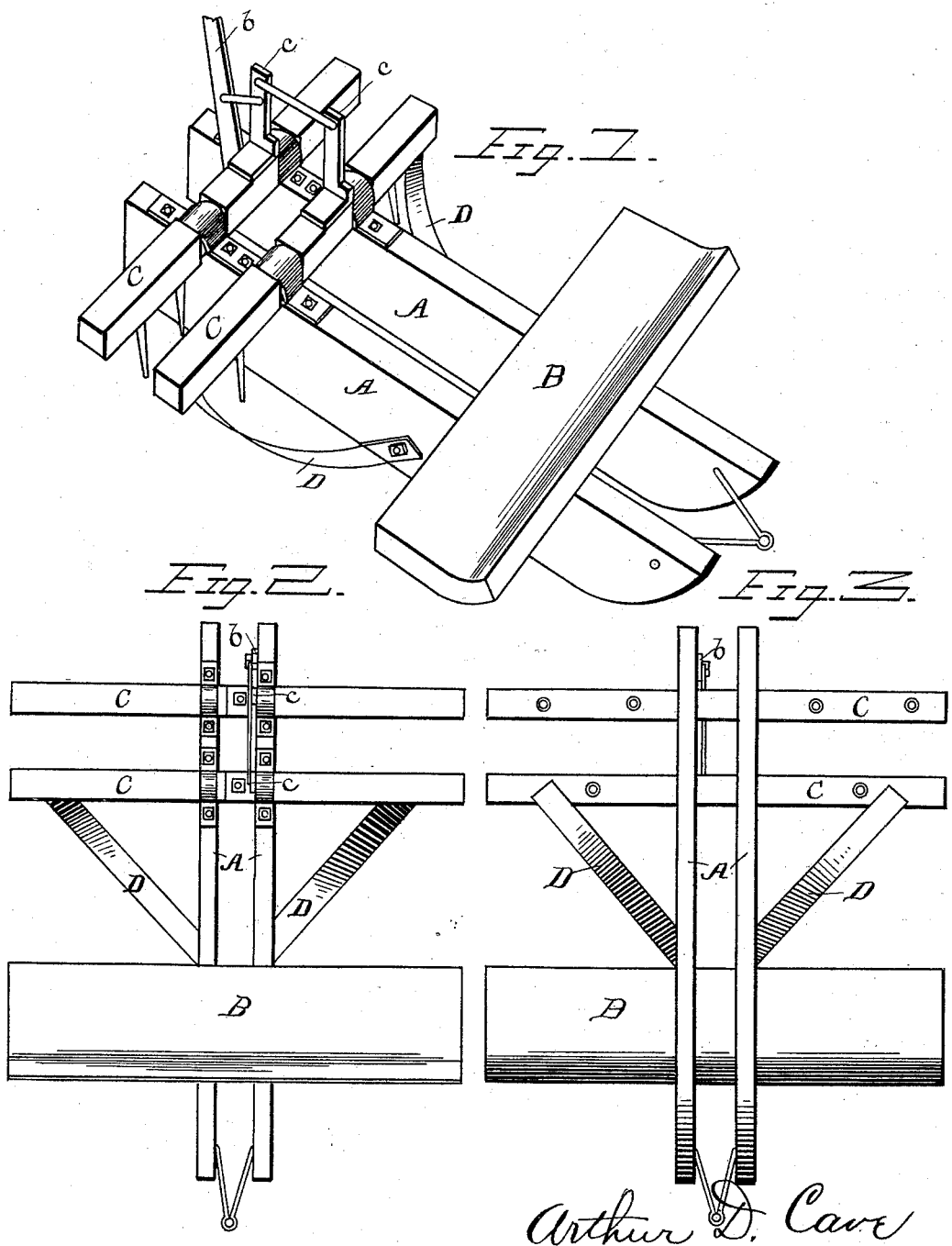

ARTHUR DORY CAVE, OF BOSTWICK, NEBRASKA.

PLOW FOR LISTED CORN.

SPECIFICATION forming part of Letters Patent No. 422,010, dated February 25, 1890.

Application filed August 6, 1889. Serial No. 319,941. (No model.)

*To all whom it may concern:*

Be it known that I, ARTHUR DORY CAVE, a citizen of the United States, residing at Bostwick, in the county of Nuckolls and State of Nebraska, have invented certain new and useful Improvements in Plows for Listed Corn; and I do hereby declare the following to be a full, clear, and exact description of the invention, such as will enable others skilled in the art to which it appertains to make and use the same.

My improvements relate to the construction of a cultivator for corn or other growing crops planted in rows, the especial object of which is to provide a combined harrow and plow for cultivating what is known as "listed corn." This result is secured by means of the following-described device, reference being had to the accompanying drawings, in which similar letters of reference refer to corresponding parts in all the views.

Figure 1 is a perspective view of my invention complete. Fig. 2 is a plan view. Fig. 3 is a bottom view.

In order to provide a carriage for various parts of my invention, I arrange two runners parallel with each other, separated by a space of eight or ten inches, more or less, such runners being so arranged as to permit the plants to be cultivated to pass between them. Upon the upper surface of these runners and near their rear ends I journal the transverse beams C C. The under sides of these beams are provided with a series of teeth on that part reaching past the runners, while upon their upper surface immediately between said runners I erect the operating-standards *c c*, which are to be connected by a suitable reach, while at the rear end of one of the runners I pivotally attach lever *b*, which is connected by a suitably-provided rod to the rear standard just referred to, and it will be seen that the position of the transverse beams C C is regulated by the movement of said lever. Upon the front part of the runners is securely attached the platform B, the purpose of which is to secure such runners and also to provide a platform for the driver. Attached to each of the runners upon their outer sides and immediately under said platform are blades D D, which are bent outward and upward and somewhat resemble and serve the purpose of the usual mold-board of ordinary plows. Those who are familiar with the requirements of a plow which is intended especially for cultivating listed corn will at once recognize the purpose served by said blades, as a line of vegetation marks the surface of that part of the soil covered but not loosened by the lister, and these blades, by occupying the position as shown, will loosen and destroy such line of vegetation, while the obvious purpose served by the teeth in the transverse beams C C is to further loosen and pulverize the soil to place it in condition to settle around the plants between the runners after said runners are drawn forward. The pivotal connection of the transverse beams, as shown by their journal attachment to the runners, is to enable the operator to set the teeth in said beams at varying angles, as may be desired.

Two or more of these plows may be used simultaneously, if desired, by properly connecting them.

Having thus described my invention, what I claim as new, and desire to secure by Letters Patent, is—

The improved plow for listed corn, herein described and shown, consisting of the runners A A, the platform B, secured upon said runners near the front ends of the same, the tooth-bars C C, journaled upon the runners, near the rear ends thereof, and projecting laterally beyond the runners, the teeth depending from the ends of the tooth-bars, the standards erected on the tooth-bars, the link connecting said standards, the lever pivoted on one of the runners, the pitman connecting the lever with one of the standards, and the blades D, secured to the outer sides of the runners and projecting rearward, outward, and upward, as specified.

In testimony whereof I affix my signature in presence of two witnesses.

ARTHUR DORY CAVE.

Witnesses:
WM. WILLIAMS,
F. M. PHILLIPS.